United States Patent

[11] 3,601,709

[72] Inventors Vladimir Nikolaevich Dyachkov ulitsa Stendera I, kv. 1; Zhanna Nikolaevna Lupaschenko, ulitsa Berznieki-Upisha, 10, kv. 8; Ljubov Petrovna Pyatkina, ulitsa Lenina, 236, kv. 36, all of Riga, U.S.S.R.

[21] Appl. No. 749,851
[22] Filed Aug. 2, 1968
[45] Patented Aug. 24, 1971
[32] Priority Aug. 9, 1967
[33] U.S.S.R.
[31] 1,177,905

[54] A PULSE TRAIN REGENERATION SYSTEM
3 Claims, 3 Drawing Figs.

[52] U.S. Cl. .......... 328/164, 307/208, 307/221, 307/269, 328/37, 328/72, 328/155, 328/162
[51] Int. Cl. .......... H03k 5/00, H03b 1/04, H04b 1/10
[50] Field of Search .......... 328/37, 63, 155, 72, 162–164; 307/221, 268, 269, 208

[56] References Cited
UNITED STATES PATENTS

| | | | |
|---|---|---|---|
| 3,354,433 | 11/1967 | Minc .......... | 307/269 X |
| 3,390,283 | 6/1968 | Hannigsberg .......... | 307/268 |

*Primary Examiner*—Stanley D. Miller, Jr.
*Attorney*—Waters, Roditi, Schwartz & Nissen

ABSTRACT: A pulse train regeneration system for regenerating a control pulse train, including at least two shift registers. Each of the shift registers is provided with at least a last stage, the last stage including flip-flops, an inverter, two coincidence circuits, each of the coincidence circuits being provided with at least two inputs, one input of each of the two inputs being connected to the output of a respective one of the shift registers, a train of the first of said two inputs timing pulse supplied to the input of the last stage and being supplied through the inverter to the first input of said two coincidence circuits timing pulse, the second timing pulse being time delayed with respect to the timing pulse train of the first inputs and being supplied to the other two inputs of the coincidence circuits, the control pulse train being supplied to the last stage and an output flip-flop having at least two inputs, each of the two inputs of the output flip-flop being connected to the output of a respective one of the two coincidence circuits.

A PULSE TRAIN REGENERATION SYSTEM

The invention relates generally to communication devices and more particularly to DC pulse correctors employed therein. The invention may be used for correcting DC pulses in automatic exchanges and for protecting control devices interference.

Heretofore shift registers have been used employing two and more flip-flops controlled by timing pulses time delayed with respect to one another (cf. K. Rumpp, M. Pulves "Handbook of Transistorized Circuits").

The present invention provides a pulse corrector for communication devices controlled by timing pulses for correcting the leading and trailing edges of pulses and protecting control units employed in communication devices from interference.

This is achieved by the provision of a DC pulse corrector for communication devices which, according to the invention, includes two shift registers employing flip-flops controlled by timing pulses; and output flip-flop; two coincidence circuits, one of the inputs of each circuit being connected to the output of a corresponding shift register; other inputs of the coincidence circuits being supplied through an inverter with timing pulses time-delayed with respect to the timing pulses which are applied to the inputs of the last flip-flops of the both shift registers, whereas the outputs of the coincidence circuits are connected to the inputs of the output flip-flop.

The invention will be more clear from the description of embodiments thereof given by way of examples reference being made to the accompanying drawings, wherein.

Figures 1, 2:
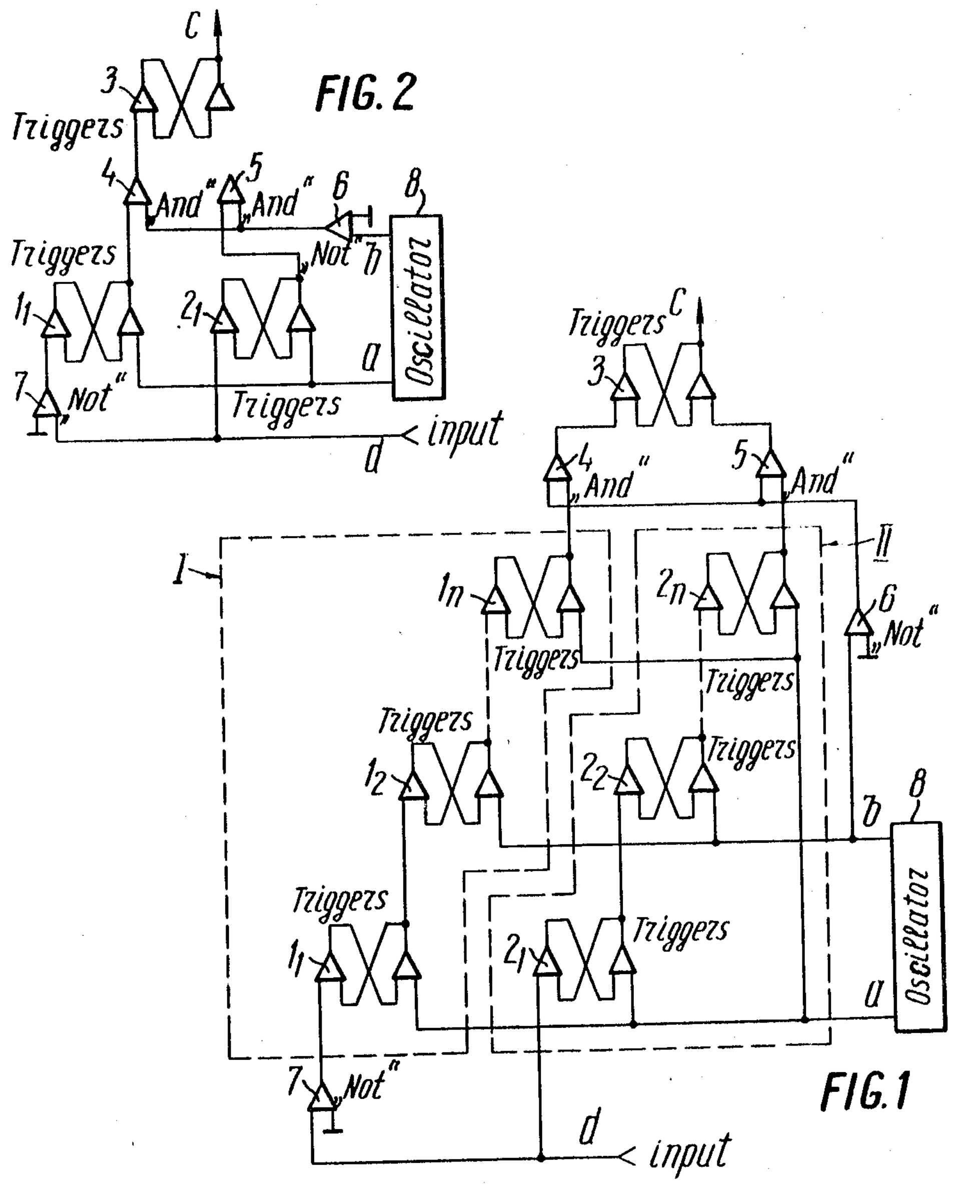
FIG. 1 is a block diagram of the pulse corrector, according to the invention.
FIG. 2 is a block diagram of the pulse corrector for the case of $n$=1.

The present DC pulse corrector for communication devices comprises two shift registers I and II (FIG. 1) including storage elements, such as flip-flops $1_1 - 1_n$ (shift register I) and $2_1 - 2_n$ (shift register 1), and $2_1$–$2_n$ (shift register 11), an output flip-flop 3, two coincidence circuits 4 and 5 and two inverters 6 and 7.

THe control inputs of both shift registers I and II through the bus d are supplied with control pulses being 180° out of phase (FIG. 1). The flip-flops ($1_1$–$1_n$ and $2_2$–$2_n$) in both shift registers I and II are connected such that the corresponding output of the first flip-flop $1_1$ ($2_1$) is connected to the input of the second flip-flop $1_2$($2_2$ ), whereas the corresponding output of the second flip-flop $1_2$($2_2$) is connected to the input of the third flip-flop $1_3$ ($2_3$) and so on up to the $n^{th}$ flip-flop, while the corresponding outputs of the last flip-flops $1_n$ ($2_n$) in the shift registers I and II are connected to one input, respectively, of the two-input coincidence circuits 4 and 5.

THe other inputs of the flip-flops of both shift registers are supplied with timing pulses, the inputs of the odd flip-flops $1_1$, $1_3$, $1_5$ etc. ($2_1$, $2_3$, $2_5$ etc.) of the shift registers I and II being supplied with pulses on the bus $a$ of the timing-pulse generator or timer (the timing-pulse generator or timer is not shown in FIG. 1), and the inputs of the even flip-flops $1_2$, $1_4$, $1_6$ etc. ($2_2$, $2_4$, $2_6$) are supplied with pulses on the bus $b$.

The second inputs of the coincidence circuits 4 and 5 are fed through the inverter 6 with timing pulses time delayed with respect to the timing pulses applied to the inputs of the last flip-flops $1_n$ ($2_n$) of both shift registers I and II. The outputs of the coincidence circuits 4 and 5 are connected to the inputs of the output flip-flop 3 from whose output a corrected signal is derived. From the other output of the output flip-flop 3 the complement of the corrected signal is derived.

For the case when $n$—1 (FIG. 2) the corresponding outputs of the first flip-flops $1_1$ and $2_1$ of both shift registers are directly connected to the inputs of the coincidence circuits 4 and 5.

The shift registers in case of $n$=1 employ only two flip-flops $1_1$ and $2_1$, while the corrector includes the output flip-flop 3, two coincidence circuits 4 and 5 and two inverters 6 and 7. One respective input of the flip-flops $1_1$ and $2_1$ is fed with complementary control pulses, while the other respective input receive timing pulses carried on the bus $a$ of the timing-pulse generator (the timing-pulse generator is not shown in FIG. 2). The signal coming supplied at the corresponding outputs of flip-flops $1_1$ and $2_1$ are fed to the inputs of the coincidence circuits 4 and 5, whose other inputs are fed with timing pulses through the inverter 6 from the bus $b$; These timing pulses are time-delayed with respect to the pulses arriving through the bus $a$.

The inverter 6 connected to the bus $b$ of the timing-pulse generator changes the phase of the timing pulses when the timing pulses arrive through the busses $a$ and $b$ in the same phase.

The inverter 7 changes the phase of the control pulses which arrive to the input of the flip-flop $1_1$.

The pulses taken off from the outputs of the coincidence circuits 4 and 5 are applied to the inputs of the output flip-flop 3 from whose outputs the output pulses having the desired phase may be taken off.

Figure 3:
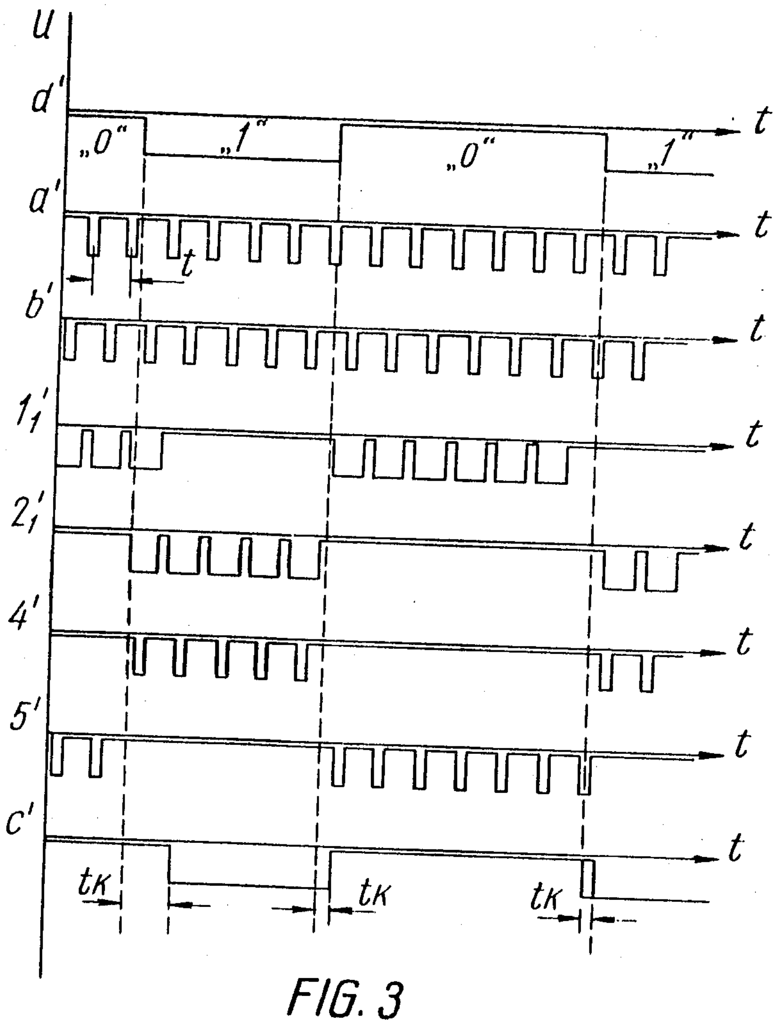
FIG. 3 is a diagram of waveforms occuring in the pulse corrector in operation for the case of $n$—1.

The timing diagram shown in FIG. 3 represents the following:

$d'$ are the control pulses arriving at one of the inputs of the flip-flops $1_1$ and $2_1$ of the corrector ( the bus $d$ ), $a'$ denotes the timing pulses arriving at the other inputs of the flip-flops $1_1$ and $2_1$ (the bus $a$ of the timing-pulse generator), $b'$ is the timing pulses arriving at the inputs of the coincidence circuits 4 and 5 (the bus $b$ of the timing-pulse generator), $1_1 1'$ are the pulses produced at the output of the flip-flop $1_1$, $2_1$ are the pulses produced at the output of the flip-flop $2_1$ $4'$ are the pulses produced at the output of the coincidence circuit 4, $5'$ are the pulses produced at the output of coincidence circuit 5, $c'$ symbolizes the pulses produced at the output of the output flip-flop 3.

The present DC pulse corrector for communication devices operates as follows:

"0" and "1" are binary representations of low and high voltage levels, respectively. The timing pulses supplied by the timing-pulse generator are applied to the inputs $a$ and $b$. The control pulses distorted in their leading and trailing edges, as well as the pulses distorted in any portion due to interference, are applied to the inputs of the flip-flops $1_1$ and $2_1$ of the shift registers I and II of the corrector through the bus $d$. The corrected pulses are taken from the output $c$ or their complement from the other output of the flip-flop 3.

Upon applying to the inputs of the flip-flops $1_1$ and $2_1$ (FIG. 2) through the bus $d$ a potential corresponding to 1 ($d$ of FIG. 3), the potential corresponding to 0 (FIG. 3) will appear at the output of the flip-flop $1_1$, whereas the output of the flip-flop $2_1$ (FIG. 2) a train of pulses equal in length and complementary to the timing pulses shown at the bus $a$ will appear.

The train of pulses equal in length and in phase to the timing pulses shown at the bus $b$ will appear at the output of the coincidence circuit 4 (FIG. 2), whereas at the output of the coincidence circuit 5 (FIG. 2) the potential $d$ corresponding to "0" will appear (FIG. 3).

The output flip-flop 3 (FIG. 2) assumes such a state that at its output $c$ a binary "I" appears, whereas at its other output a binary zero "0" will appear, the leading and trailing edges of the output pulses being time delayed by the time $t_k$ which is determined by the choice of the repetition frequency of the timing pulses at the busses $a$ and $b$ , as well as by their phase shift with respect to one another. When the control pulse "1" at the bus $d$ becomes a binary "0" the flip-flops $1_1$, $2_1$ and 3 will change their states. At the outputs of the coincidence circuits 4 and 5 pulses will appear, complementary to the preceding ones; at the output $c$ of the output flip-flop 3 the potential will appear, corresponding to "0" time-delayed by the time $t_k$ with respect to the input pulse arriving through the bus $d$.

THe minimum time delay $t_k$ (correction time) time) of the input pulses for the case under consideration i.e. the symmetrical shift of the timing pulses at the busses $a$ and $b$, equals the 1/2T of the timing pulses, where T stands for the repetition interval of the timing pulses involved.

The present pulse corrector is capable of protecting the devices connected to the output thereof from random interference fractioning the pulse by the time smaller than 1/2T, whereas the rise time and the decay time of the control pulses may be within 0 to 1/2T of the timing pulses.

Thus, the present pulse corrector provides the ability to effect the correction of DC pulses as to their leading and trailing edges and can find application for protecting control units employed in the communication devices from interference.

Depending upon the required degree of accuracy of the correction time ($t_k$) both the number of the correcting members in the shift registers I and II and the frequency of the timing pulses are selected.

Although this invention has been described with respect to a particular embodiment thereof, it is not to be so limited as changes and modifications may be made therein which are within the full intended scope of the invention as defined by the appended claims.

We claim:

1. A pulse train regeneration system for regenerating a control pulse train comprising two shift registers each of said two shift registers including at least a last stage, said last stage being provided with flip-flops, an inverter, two coincidence circuits, each of said two coincidence circuits being provided with at least two inputs, one input of each of said two inputs being connected to the outputs of a respective one of said shift registers, a timing pulse train of the first of said two inputs supplied to the input of said last stage and being supplied to the first inputs of said two coincidence circuits; a timing pulse train of the second inputs of said two inputs being time delayed with respect to said timing pulse train of the first inputs and being supplied through said inverter to the other inputs of the two coincidence circuits, said control pulse train being supplied to said last stage, and an output flip-flop having at least two inputs, each of said two inputs of said output flip-flop being connected to the output of a respective one of said two coincidence circuits.

2. A pulse train regeneration system as claimed in claim 1, wherein each of said two shift registers include a single flip-flop.

3. A pulse train regeneration system as claimed in claim 1, wherein the amount said second timing pulse is delayed with respect to said first timing pulse is at least one-half the time between repetition of said first timing pulse.